United States Patent
Van Fleet, Jr.

(10) Patent No.: US 7,270,084 B2
(45) Date of Patent: Sep. 18, 2007

(54) SMALL ANIMAL SHIPPING ASSEMBLY

(75) Inventor: Kenneth Louis Van Fleet, Jr., Wolcott, NY (US)

(73) Assignee: Marshall Farms Group, Ltd., North Rose, NY (US)

( * ) Notice: Subject to any disclaimer, the term of this patent is extended or adjusted under 35 U.S.C. 154(b) by 17 days.

(21) Appl. No.: 11/063,445

(22) Filed: Feb. 22, 2005

(65) Prior Publication Data
US 2006/0185614 A1    Aug. 24, 2006

(51) Int. Cl.
*A01K 1/00* (2006.01)

(52) U.S. Cl. .................. 119/496; 119/497; 119/500; 119/453

(58) Field of Classification Search ............ 119/497, 119/496, 500, 453, 165, 61.5; 229/120.1
See application file for complete search history.

(56) References Cited

U.S. PATENT DOCUMENTS

| | | | |
|---|---|---|---|
| 3,048,147 A * | 8/1962 | McKean | 119/496 |
| 3,710,761 A * | 1/1973 | Gregory | 119/496 |
| 3,749,061 A | 7/1973 | Connelly | |
| 4,834,261 A * | 5/1989 | Brdlik | 141/332 |
| 5,462,015 A * | 10/1995 | Murphy | 119/496 |
| 6,223,691 B1 * | 5/2001 | Beattie | 119/453 |
| 6,338,316 B1 * | 1/2002 | Weaver | 119/453 |
| 6,615,765 B1 * | 9/2003 | Thomas | 119/165 |

* cited by examiner

*Primary Examiner*—Peter M. Poon
*Assistant Examiner*—Willie Berry, Jr.
(74) *Attorney, Agent, or Firm*—Fay Sharpe LLP

(57) ABSTRACT

A pet shipping assembly for small animals includes a container and a container lid. The container includes a base wall and a side wall extending upwardly from the base wall. The side wall can include a plurality of vent holes. An interior wall extends from the base wall and/or the side wall to create a food/water compartment. The container lid is configured to selectively attach to the side wall of the container. The container lid includes at least one food/water opening located on the lid such that when the lid is attached to the side wall to cover the inside of the container, the food/water opening in the lid is generally aligned with the food/water compartment in the container.

18 Claims, 6 Drawing Sheets

SMALL ANIMAL SHIPPING ASSEMBLY

BACKGROUND OF THE INVENTION

Small animals, such as ferrets and the like, typically are shipped from a farm to a pet distributor. The small animals are placed into a container for shipment to the distributor. En route the small animals require food and water so that they arrive healthy at the pet distributor.

SUMMARY OF THE INVENTION

A pet shipping assembly for small animals includes a container and a container lid. The container includes a base wall and a side wall extending upwardly from the base wall. The side wall can include a plurality of vent holes. An interior wall extends from the base wall and/or the, side wall to create a food/water compartment. The container lid is configured to selectively attach to the side wall of the container. The container lid includes at least one food/water opening located on the lid such that when the lid is attached to the side wall to cover the inside of the container, the food/water opening in the lid is generally aligned with the food/water compartment in the container.

The container lid and the container can also be configured such that when one shipping assembly is stacked upon another shipping assembly, the base wall of the upper shipping assembly is spaced from an upper surface of the lid of the lower shipping assembly. This space allows for ventilation between the two shipping assemblies.

DETAILED DESCRIPTION OF THE INVENTION

Figure 1:
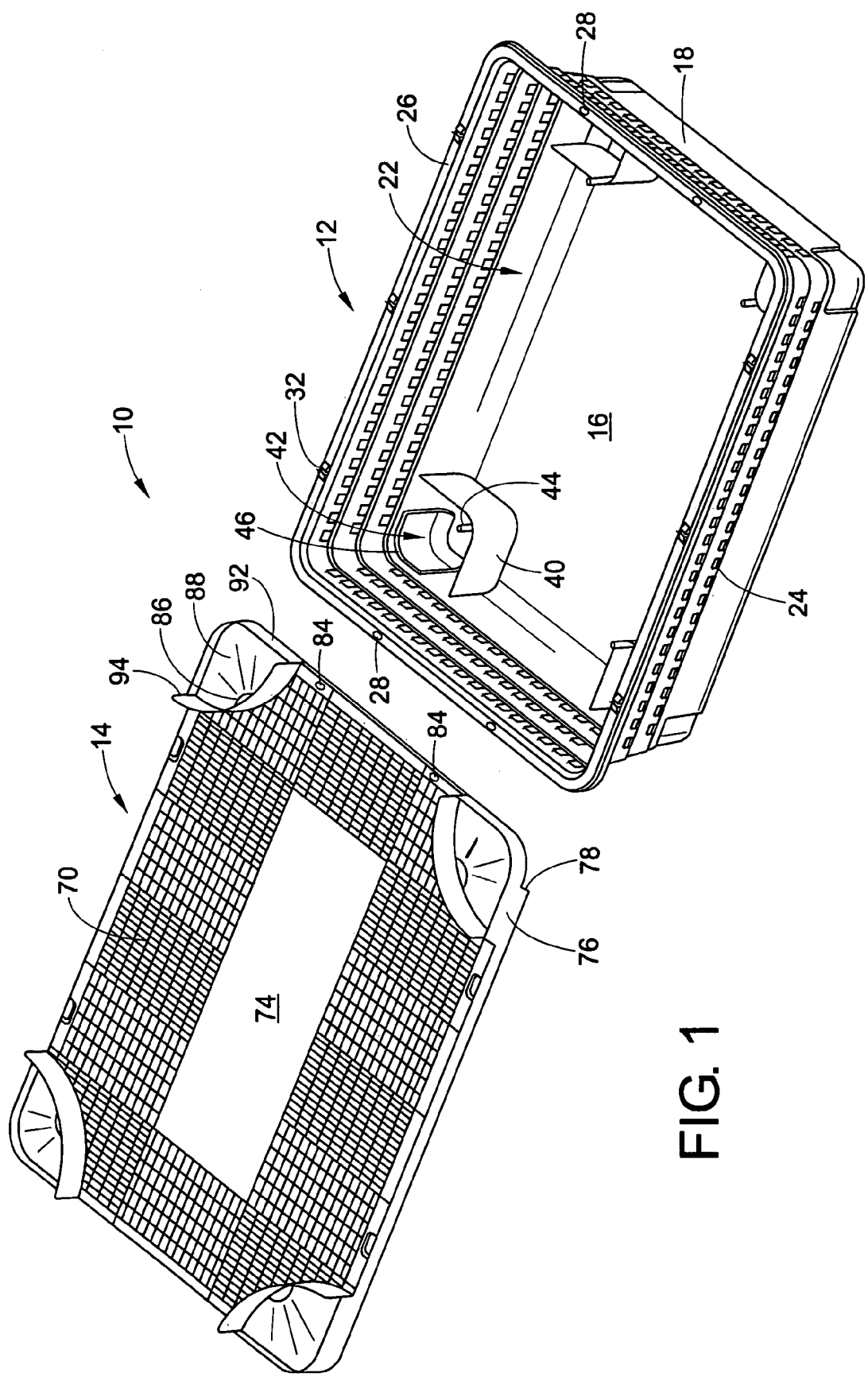
FIG. 1 is a top perspective view of a container and a container lid of a small animal shipping assembly.

With reference to FIG. 1, a small animal shipping assembly 10 includes a container 12 and a container lid 14 that is configured to selectively attach to the container. In the depicted embodiment, both the container 12 and the lid 14 are made of a molded plastic. This allows the container 12 to be molded as one single piece and the lid 14 also to be molded as one single piece. Nevertheless, the container 12 and/or the lid 14 can be made from other materials and also can comprise a plurality of connected components.

The container 12 includes a rectangular base wall 16 and a side wall 18 that extends upwardly from the periphery base wall. The base wall 16 and the side wall 18 define an animal compartment 22 in which small animals can be placed. The side wall 18 includes a lower solid portion and a vented upper portion in which are formed a plurality of vent holes 24. The upper portion of the side wall 18 can have a stepped configuration such that the side walls have a slightly tapered configuration. This allows for a plurality of containers 12 to be stacked inside one another for storage before any animals are placed into the container. The vent holes 24 provide for ventilation so that the animals can easily breathe inside the container.

A ledge 26 extends outwardly from an upper end of the side wall 18. The ledge 26 is generally L-shaped in cross section having a portion that is generally parallel to the base wall 16 and a portion that is generally parallel to the side wall 18. The ledge 26 includes fastener openings 28 on opposite longitudinal ends of the base wall 16 and small ramps 32 on opposite lateral sides of the base wall 16. The fastener openings 28 and the ramps 32 cooperate with the container lid 14, in a manner that will be described in more detail below, to securely attach the lid to the container.

Inside of the container 12, a plurality of interior walls 40 extend upwardly from the base wall 16 and outwardly from the side wall 18. In the depicted embodiment, the interior walls 40 are generally L-shaped in plan view and are disposed in corners of the compartment 22. The interior wall 40, the side wall 18 and the base 16 define a food/water compartment 42 in which food and/or water for the small animal can be placed. Since food and/or water is placed in the compartment 42, the interior wall 40 extends only up the lower solid portion of the side wall 18 terminating before reaching the vented upper portion.

A pin 44 extends upwardly from an interior corner of each interior wall 40. A support ledge 46 extends inwardly from the side wall 18 into the food/water compartment 42. The support ledge 46 is generally L-shaped in plan view. An upper surface of the ledge 46 is disposed at the same height as an upper edge of the interior wall 40.

Figure 6:
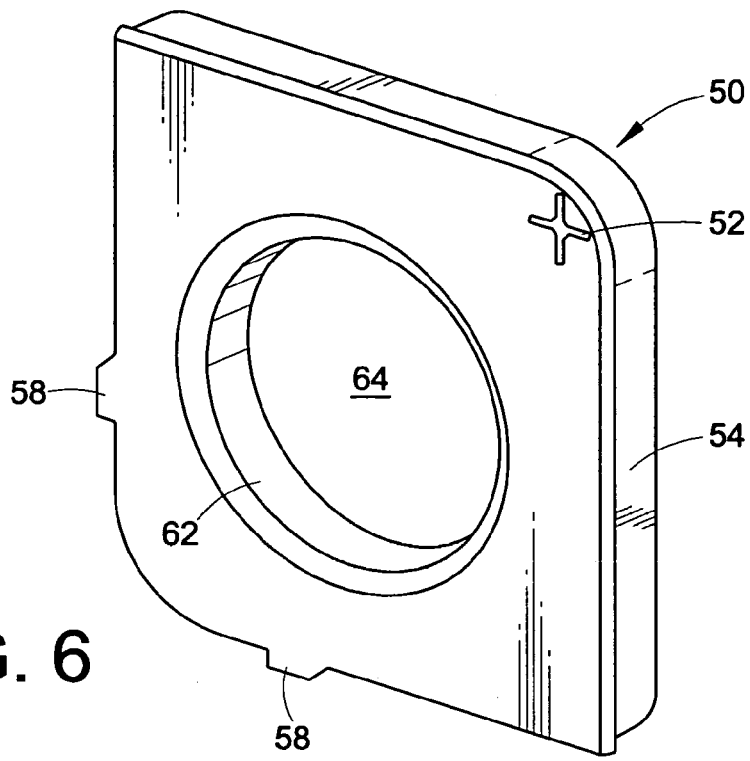
FIG. 6 is a top perspective view of a compartment lid for use with the assembly depicted in FIG. 1.
Figure 7:
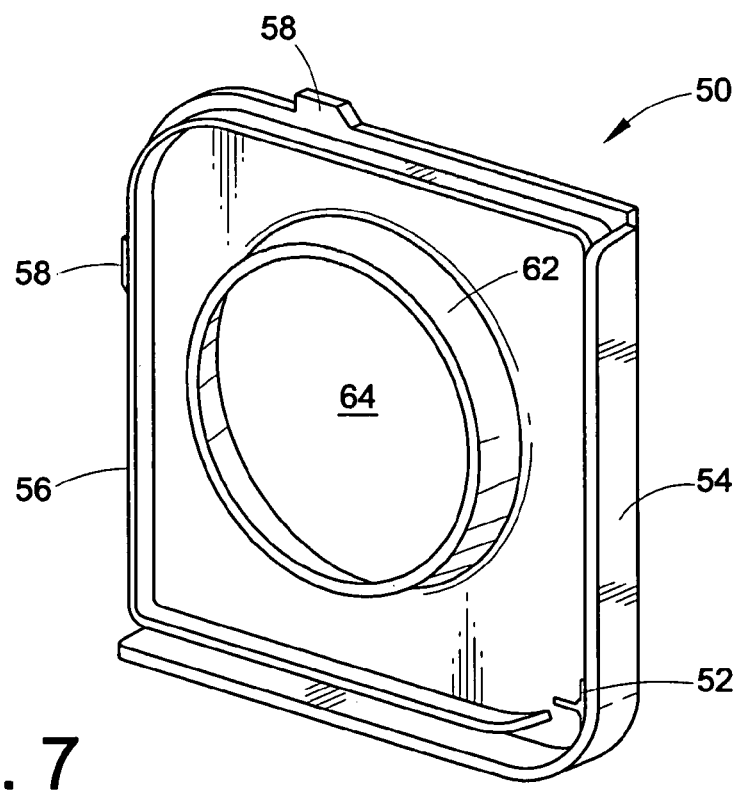
FIG. 7 is a bottom perspective view of the compartment lid of FIG. 6.

With reference to FIGS. 6 and 7, a food/water compartment lid 50 selectively attaches to the interior wall 40 to inhibit any food and/or water from spilling out of the compartment 42 during shipment of the animals. The compartment lid 50 is a generally planar structure having a periphery that follows the contour of the interior wall 40 and the side wall 18. The compartment lid 50 includes a pin opening 52 near a corner that is dimensioned to receive the pin 40 for attaching the compartment lid 50 to the interior wall 40. The pin opening 52, in this particular embodiment, includes slits that emanate from a substantially circular opening. The central opening has a diameter that is slightly less than the diameter of the pin 44. The slits allow a portion of the lid 50 that is near the opening 52 to flex when the pin 44 is received into the opening 52. Accordingly, a friction fit between the pin 44 and the opening 52 of the compartment lid 50 is achieved.

The compartment lid 50 also includes a downwardly depending outer side wall 54 that matches the contour of the interior wall 40 of the container 12 and an interior side wall 56 (FIG. 7) that matches the contour of both the interior wall 40 and the side wall 18. The interior side wall 56 travels around the periphery of the compartment lid 50 and terminates near the fastener opening 52. When the compartment lid 50 is placed onto the interior wall 40 of the container 12, the interior wall 40 is received between the outer side wall 54 and the inner side wall 56 of the compartment lid 50. The side walls provide for proper alignment of the compartment lid 50 on the interior wall 40.

The compartment lid 50 also includes two tabs 58 that are formed on adjacent sides of the compartment lid 50; the aforementioned adjacent sides meet at a rounded corner that is opposite the pin opening 52. The tabs 58 rest on an upper surface of the support ledge 46 (FIG. 1) when the compartment lid 50 is placed on the interior side wall 40.

The compartment lid 50 also includes a circular inwardly depending skirt 62 that defines an opening 64. The small animal can access the food and/or water that is placed inside the compartment 42 through the opening 64. The skirt 62 can inhibit food and/or water from spilling out of the compartment 42 during shipment.

Selective attachment between the food/water compartment lid 50 and the interior wall 40 can be achieved in other similar manners. In lieu of the pin/opening attachment, the outer side wall 54 and/or the inner side wall 56 can cooperate with the interior wall 40 to provide a snap fit, or similar fit. This is just one example of a number of manners in which the compartment lid 50 can selectively attach to the interior side wall 40.

Figure 2:
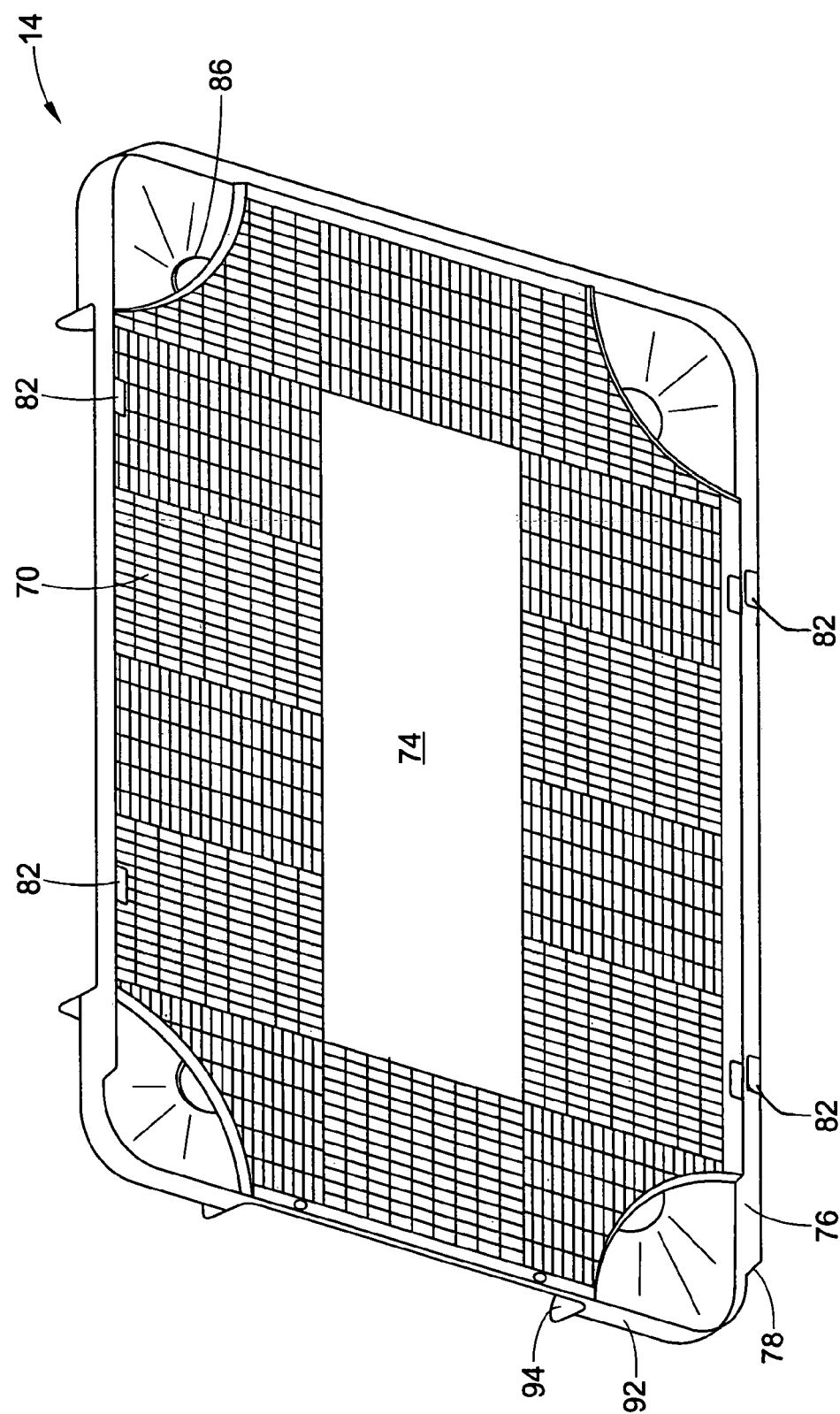
FIG. 2 is a bottom perspective view of the container lid shown in FIG. 1.

As mentioned above, the container lid 14 selectively attaches to the container 12. With reference back to FIG. 1, the lid 14 includes a plurality of vent holes 70 that extend through the lid and a solid central section 74. A skirt 76 extends downwardly from an upper surface of the compartment lid 14 substantially around the entire periphery of the lid leaving an opening 78 at a longitudinal end of the lid so that the lid can be slid onto the side wall 18 of the container 12. For the embodiment depicted in FIG. 1, the skirt 76 extends around three sides of the lid 14 while providing the opening 78. With reference to FIG. 2, a plurality of fingers 82 extend inwardly from the skirt 76 on opposite lateral sides of the lid 14. The fingers 82 are spaced from the upper surface of the lid 14 so that the ledge 26 (FIG. 1) of the container 12 is sandwiched between the fingers 82 and the upper surface of the lid 14 when the lid is slid onto the side wall 18 of the container. With reference back to FIG. 1, the ramps 32 that are formed on the flange 26 of the container 12 allow the lid 14 to slide more easily onto the side wall 18 of the container. The small ramps 32 limit the points of contact between the lid 14 and the container 12, accordingly friction between the lid 14 and the container 12 is reduced. Also, having limited contact points per side allows the container lid 14 to more easily flex to conform to the shape of the container so that a more secure fit between the lid and the container is achieved.

The container lid 14 also includes fastener openings 84 that are formed on the longitudinal ends of the lid 14. The fastener openings 84 align with the fastener openings 28 when the lid 14 is slid onto the container 12 to cover the animal compartment 22 of the container. Fasteners (not shown) can be received inside the fastener openings 28 and 84 to further secure the lid 14 to the container 12.

The food/water compartments 42 of the container 12 can be refilled while the compartment lid 14 covers the animal compartment 22 of the container 12. As seen in FIG. 1, the lid 14 includes a plurality of food/water openings 86 that are positioned above each food/water compartment 42 of the container 12 when the lid 14 is fully slid onto the container 12. The food/water openings 86 also align over the openings 64 in the food/water compartment lid 50 when it is mounted on the interior wall 40. In the embodiment depicted, the food/water openings 86 are crescent-shaped and are formed through a solid sloping surface 88 located at each corner of the lid 14. The sloping surface 88 slopes towards the food/water opening 86 so that food and/or water can be poured onto the sloping surface 88 and drain into the opening 86. An outer wall 92 extends upwardly from the sloped surface 88 to retain any water and/or food that is poured onto the sloped surface 88. A standoff 94, which extends higher from the sloped surface 88 than the outer ledge 92, is positioned at an end of the sloped surface 88. The standoff 94 is spaced inward from the corner of the compartment lid 14 and connects at opposite ends to the outer wall 92. In addition to catching any food and/or water and directing it towards the opening 86, the standoffs 94 space one assembly from another when the assemblies are stacked on top of one another such as that shown in FIG. 5.

Figure 3:
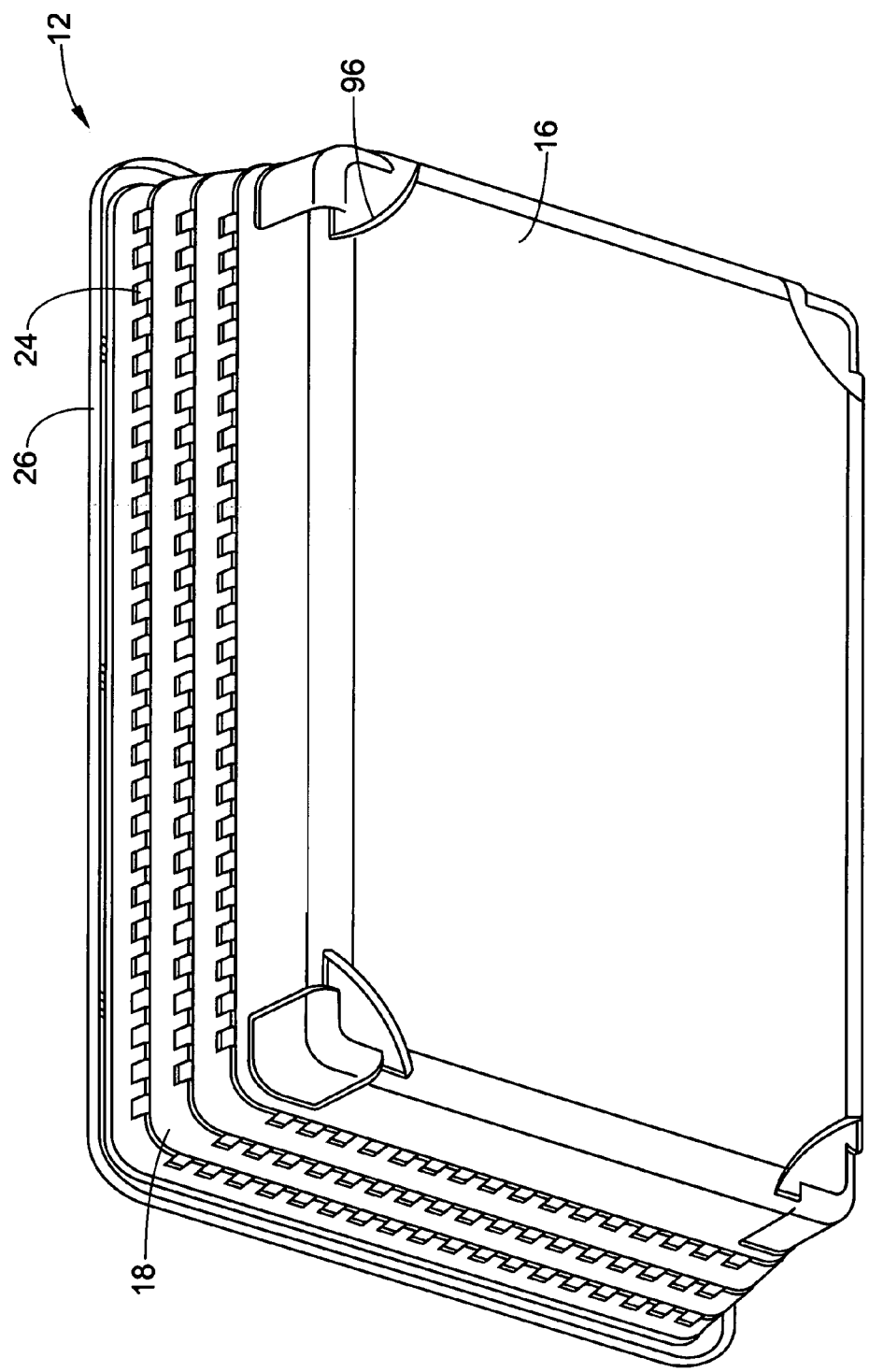
FIG. 3 is a bottom perspective view of the container shown in FIG. 1.
Figure 4:
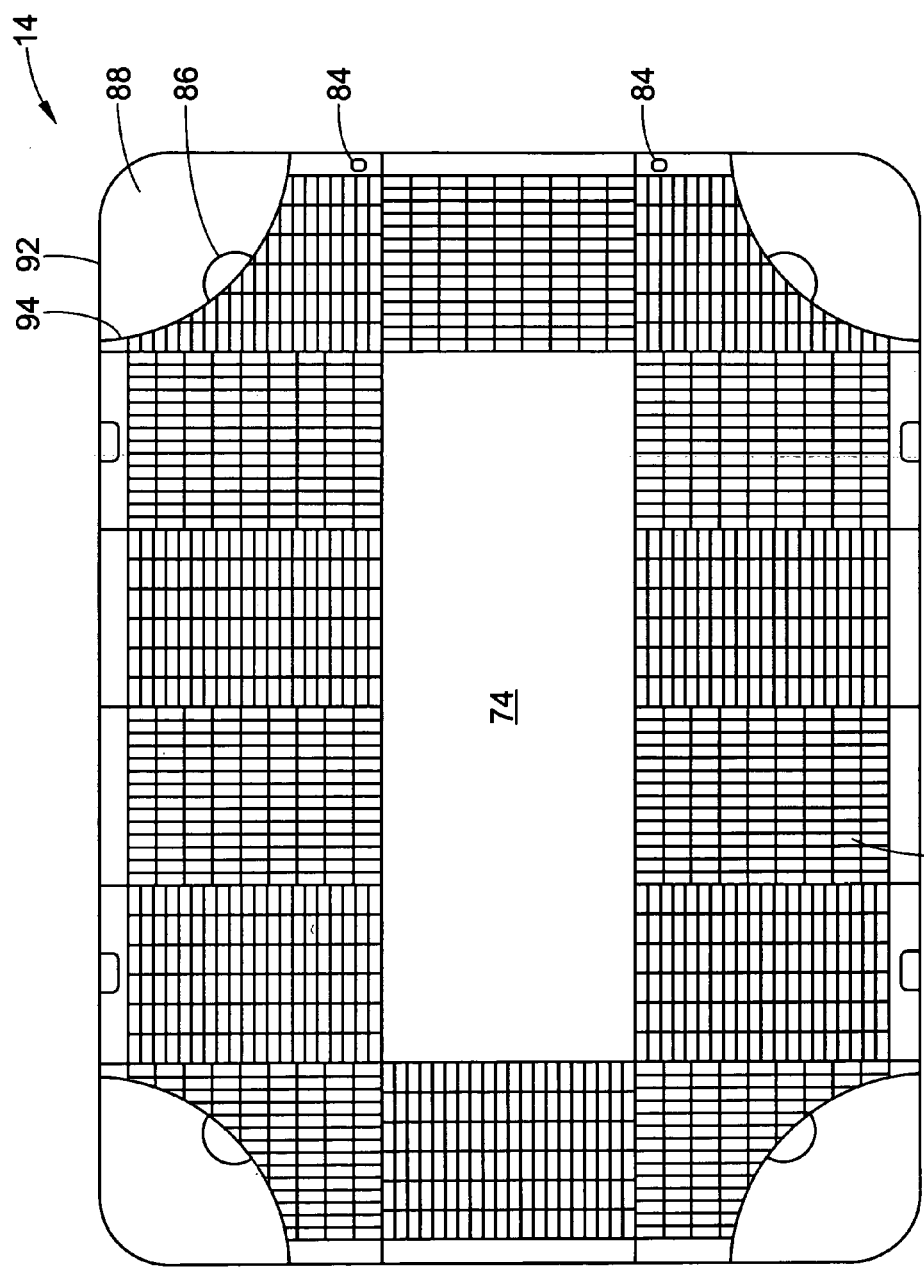
FIG. 4 is a plan view of the container lid of FIGS. 1 and 2.
Figure 5:
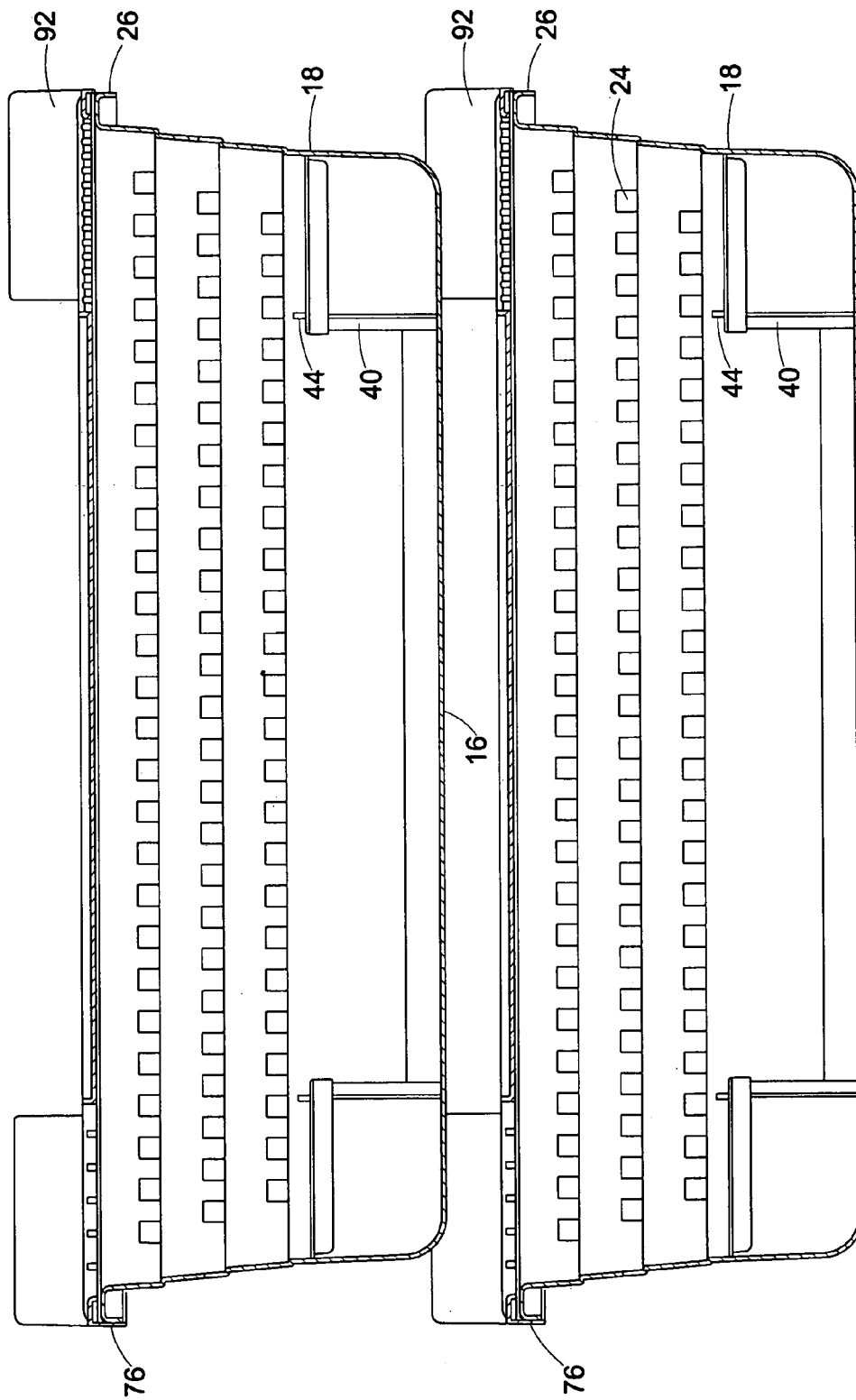
FIG. 5 is a cross-sectional view of a first animal shipping assembly stacked upon a second animal shipping assembly.

With reference to FIG. 3, the base wall 16 of the container 12 includes a plurality of standoff receptacles 96 that are appropriately shaped to match the contour of the standoff 94 of the lid 14. Accordingly, the receptacles 96 act as a locator for the standoffs 94 so that the shipping assemblies can be stacked on top of one another as seen in FIG. 5. The height of the standoff 94 is adequate to provide ventilation between the lid 14 of a lower assembly and the base wall 16 of the upper assembly. Ventilation between a lower assembly and an upper assembly can also be achieved by having the standoff extending downwardly from the base wall of the upper assembly and cooperating with a receptacle formed in the lid of the lower assembly.

A shipping assembly for shipping small animals has been described with sufficient detail for one skilled in the art to make and use the assembly. The invention is not limited to only those embodiments disclosed. The invention is to be defined by the appended claims and the equivalents thereof.

The invention claimed is:

1. A pet shipping assembly for a small animal, the assembly comprising:
   a base wall;
   a side wall extending upwardly from the base wall, wherein the base wall and the side wall define at least a portion of an animal compartment in which small animals can be placed;
   an interior wall extending from at least one of the base wall and the side wall and defining a food/water compartment; and
   a container lid configured for selective attachment to the side wall, the container lid including at least one food/water opening located such that when the container lid is attached to the side wall to at least substantially cover the animal compartment the food/water opening is generally aligned with the food/water compartment, the container lid also including a sloped surface portion adjacent to and sloping towards the food/water opening.

2. The assembly of claim 1, wherein the base wall includes a receptacle and the container lid includes an extension configured to cooperate with the receptacle to space the container of a first shipping assembly lid from the base wall of a second shipping assembly when the assemblies are stacked on top of one another.

3. The assembly of claim 1, wherein the side wall includes a plurality of vent holes.

4. The assembly of claim 1, further comprising compartment lid configured for selective attachment to the interior wall.

5. The assembly of claim 1, wherein the container lid includes a plurality of vent holes.

6. The assembly of claim 1, wherein the container lid includes an upwardly extending stand off adjacent the sloped surface portion and the food/water opening, wherein the sloped surface portion slopes toward the stand off.

7. The assembly of claim 1, wherein the side wall includes fastener openings, and wherein the container lid includes fastener openings that are positioned to align with the fastener openings in the side wall when the container lid is attached to the side wall to at least substantially cover the animal compartment.

8. The assembly of claim 1, further comprising a peripheral wall depending from an upper surface of the container lid, the peripheral wall terminating to provide an opening for sliding the container lid over the side wall.

9. The assembly of claim 8, further comprising a retaining finger extending from the peripheral side wall of the container lid and a ledge extending from the side wall of the container, wherein the retaining finger of the container lid engages the ledge of the side wall of the container when the container lid is slid onto the side wall of the container.

10. A shipping assembly for small animals, the assembly comprising:
   a container having a base wall and a side wall extending from the base wall, wherein the side wall and the base wall define an animal compartment in which small animals can be placed;
   an interior wall extending from at least one of the base wall and the side wall and defining a food/water compartment;
   a container lid adapted to selectively connect to the container for providing selective access to the animal compartment, the container lid including a food/water opening and a sloped surface adjacent to and sloping towards the food/water opening; and
   a standoff extending upwardly from the container lid adjacent the food/water opening for catching food or water and directing the food or water toward the food/water opening.

11. The assembly of claim 10, further comprising a food/water compartment lid for selectively covering at least a portion of the food/water compartment.

12. The assembly of claim 11, wherein the food/water opening aligns over the food/water compartment when the container lid is connected to the side wall covering the animal compartment.

13. The assembly of claim 10, further comprising a standoff receptacle disposed in the container, the standoff receptacle being configured to cooperate with the standoff such that when an associated container having the same configuration is stacked on the container lid the standoff and the standoff receptacle cooperate with one another.

14. A pet shipping assembly for a small animal, the assembly comprising:
   a base wall;
   a side wall extending upwardly from the base wall, wherein the base wall and the side wall define at least a portion of an animal compartment in which small animals can be placed;
   an interior wall extending from at least one of the base wall and the side wall and defining a food/water compartment;
   a container lid configured for selective attachment to the side wall, the container lid including at least one food/water opening located such that when the container lid is attached to the side wall to at least substantially cover the animal compartment the food/water opening is generally aligned with the food/water compartment; and
   a compartment lid configured for selective attachment to the interior wall, the compartment lid including a hole located in the compartment lid such that when the compartment lid is attached to the interior wall and the container lid is attached to the side wall to at least substantially cover the animal compartment the food/water opening of the container lid is aligned with the hole in the compartment lid.

15. The assembly of claim 14, wherein the base wall includes a receptacle and the container lid includes an extension configured to cooperate with the receptacle to space the container of a first shipping assembly lid from the base wall of a second shipping assembly when the assemblies are stacked on top of one another.

16. The assembly of claim 14, further comprising a pin extending from the interior wall and the compartment lid includes a pin opening configured to receive the pin when the compartment lid attaches to the interior wall.

17. The assembly of claim 14, further comprising a ledge extending inwardly from the side wall, and a flange extending from the compartment lid configured to rest on the ledge.

18. The assembly of claim 14, wherein the container lid includes a sloped surface portion adjacent to and sloping towards the food/water opening.

* * * * *